Sept. 9, 1969   W. PISKE   3,465,997
PIVOTAL SUPPORT OR MOUNTING
Filed Aug. 25, 1966   4 Sheets-Sheet 1

INVENTOR
WiLfRied PisKe
BY

Sept. 9, 1969          W. PISKE          3,465,997
PIVOTAL SUPPORT OR MOUNTING
Filed Aug. 25, 1966                  4 Sheets-Sheet 2

INVENTOR
Wilfried Piske
BY
his Attorney

Sept. 9, 1969　　　　　W. PISKE　　　　　3,465,997
PIVOTAL SUPPORT OR MOUNTING
Filed Aug. 25, 1966　　　　　　　　　　　　　4 Sheets-Sheet 3

INVENTOR
Wilfried Piske
BY Jacobi & Davidson
His Attorney

Sept. 9, 1969   W. PISKE   3,465,997
PIVOTAL SUPPORT OR MOUNTING
Filed Aug. 25, 1966   4 Sheets-Sheet 4

INVENTOR
Wilfried Piske
BY Jacolin E Davidson
His Attorney

United States Patent Office 3,465,997
Patented Sept. 9, 1969

3,465,997
PIVOTAL SUPPORT OR MOUNTING
Wilfried Piske, Rebstein, Switzerland, assignor to Wild Heerbrugg AG., Heerbrugg, Switzerland, a corporation of Switzerland
Filed Aug. 25, 1966, Ser. No. 575,119
Claims priority, application Switzerland, Aug. 30, 1965, 12,116/65
Int. Cl. F16m *13/00*
U.S. Cl. 248—350        19 Claims

ABSTRACT OF THE DISCLOSURE

A novel pivotal support for limited deflections and particularly for use with measuring instruments is disclosed. The novel support comprises spaced clamping body means, at least two flexurally stiff and elastic elements suspended between the clamping body means, the elastic elements crossing when viewed across the axis of rotation of the pivotal support. Means for rigidly mounting the elastic elements at the clamping body means are provided such that each of the elastic elements is forced to flex along a line which deviates from a straight line, the forced lines of flexure being defined by at least approximately cubical parabolas. With the novel pivotal support, the ratio of the restoring moment to the angle of deflection in the moment-free position of the support is that much smaller the greater the deviation the forced lines of flexure of the elastic elements are from a straight line.

---

The present invention pertains to an improved pivotal support or mounting for limited deflections, and is particularly suitable for use in conjunction with measuring instruments or the like. The inventive pivotal support is of the type which generally incorporates clamping body means between which there are clamped at least two flexurally stiff and elastic elements, these elements crossing one another when viewed in the direction of the axis of rotation of the pivotal support. It is desired that the moment brought about by the elastic elements and counteracting the deflections can be appropriately regulated or adjusted to requirements. Pivotal supports of this type are primarily used with measuring devices or instruments.

A great number of constructions are already known to the art in which the strength and the elastic properties of preferably metallic spring elements are employed for supporting or carrying a measuring device, to provide for such an axis of rotation and at the same time to produce a moment which is dependent upon the deflection. One reason which rendered it necessary to introduce to the art such type supports was their complete freedom from mechanical friction. Such renders them quite suitable, for instance, for measuring instruments of the greatest precision.

The characteristic feature of these pivotal supports, namely, to oppose a deflection of the measuring instrument out of its rest position by means of a so-called restoring moment, is then desired, for instance, if the magnitude or value which is to be measured is likewise to be transformed into a moment. In such case, indication of the measured value occurs by comparing the moment to be measured with the counteracting restoring moment. This restoring moment can also serve to impart a certain frequency behavior to an oscillating system. Such pivotal supports naturally only permit limited deflections or deviations.

However, the measuring sensitivity of an apparatus constructed according to such principle is dependent upon the magnitude of the restoring moment in relation to the deflection, in other words, the quotient of restoring moment and angle of deflection. The larger this value becomes, which as a general rule is constant within a certain range, the smaller becomes the measuring sensitivity of the apparatus with otherwise similar conditions. Small restoring moment and therefore high measuring sensitivity can be attained by appropriate dimensioning of the elastic support elements. With so-called taut suspensions, as such are frequently employed for instance in electrical measuring instruments, such is carried out for example in that the length of the suspension strip is selected to be relatively large and the strip cross-section correspondingly small. However, here there are certain limits, because the taut suspensions must carry the weight of the measuring instrument. Therefore, the restoring moment cannot be optionally small and hence the measuring sensitivity cannot be chosen to be optionally large. A high measuring sensitivity of the support can therefore only be obtained at the expense of its robustness. It is for this reason that very precise instruments or devices are dependent upon extremely careful handling or use. Their use is not possible for all conditions which occur in actual practice.

Accordingly, it is a primary object of the present invention to provide an improved pivotal support of the mentioned type which overcomes the aforementioned drawbacks of the prior art devices.

Another important object of the present invention concerns itself with a pivotal support construction which overcomes the dependence between measuring sensitivity and mechanical strength or stability of the pivotal support.

Still a further important object of the present invention relates to an improved pivotal support of the mentioned type, particularly useful in conjunction with measuring instruments, wherein the restoring moment can be regulated to accommodate operating conditions.

In order to implement these and still further objects of the present invention which will become more readily apparent as the description proceeds, the pivotal support incorporates elastic and flexurally stiff elements which, by virtue of their attachment to the clamping body means, are forced to assume a line of curvature which deviates from a straight line. These lines of curvature or flexure lines imposed upon the elastic elements may be considered as defined at least approximately by so-called cubical parabolas. Moreover, in the position of the inventive pivotal support which is free of a moment, the ratio of restoring moment to angle of deflection is that much smaller the greater the deviations of the lines imposed upon the elastic elements are from a straight line.

The invention will be better understood, and objects other than those set forth above, will become apparent, when consideration is given to the following detailed description thereof. Such description makes reference to the annexed drawings wherein.

Figure 6:
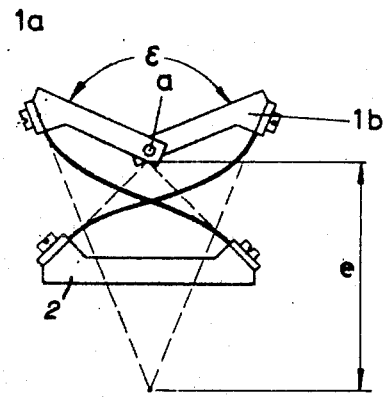
Figure 7:
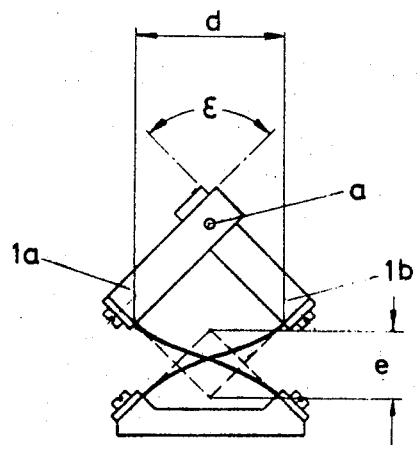
Figure 8:
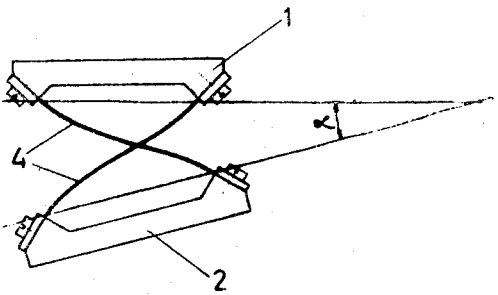
Figure 9:
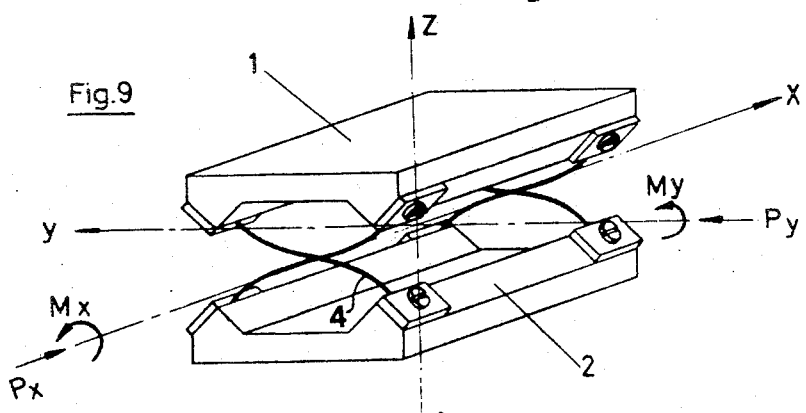
Figure 10:
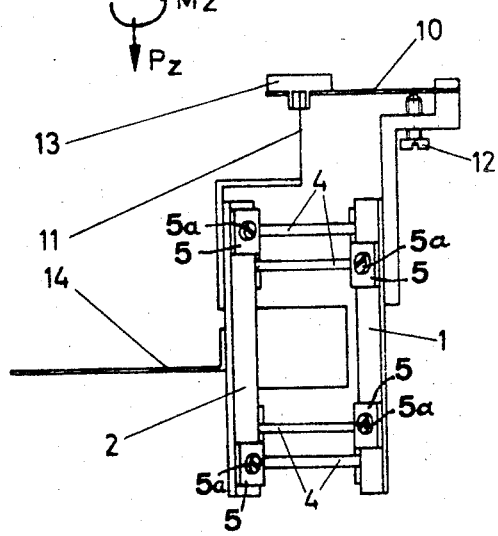
Figure 11:
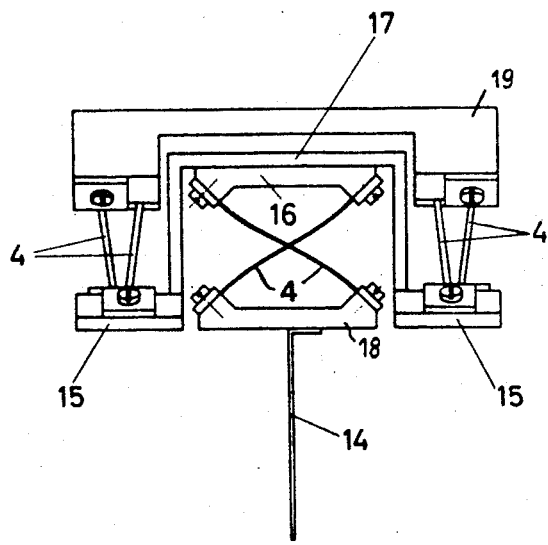

FIGURE 6 schematically depicts a further embodiment of inventive pivotal support;

FIGURE 7 depicts a pivotal support substantially of the type shown in FIGURE 6 with the pivotal clamping body members shown in a different position;

FIGURES 8 and 9 serve to explain the behavior of the inventive pivotal support under different conditions;

FIGURE 10 shows the inventive pivotal support combined with a null positioning and load relief means; and FIGURE 11 schematically depicts a support arrangement composed of two pivotal supports.

Figure 1:
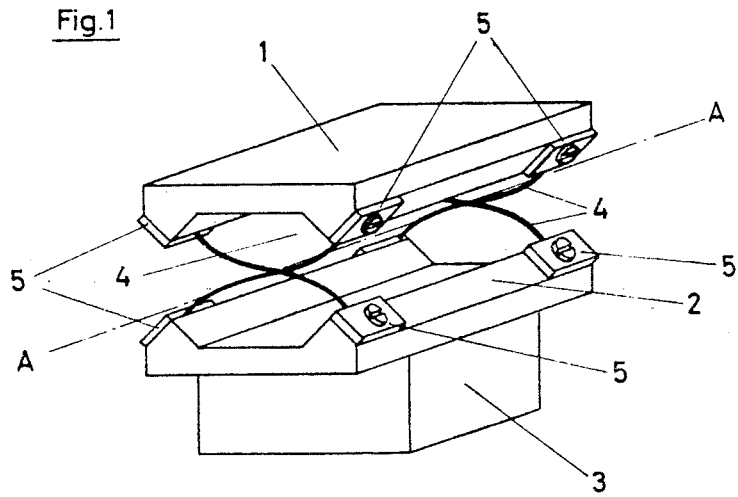
FIGURE 1 is a perspective view of a first embodiment of inventive pivotal support or mounting.

Describing now the drawings, and in particular, referring to FIGURE 1, it will be understood that there is depicted therein an exemplary embodiment of inventive pivotal support or mounting. More precisely, reference numeral 1 signifies a member which is constructed as a clamping body means which is fixedly connected with a non-illustrated housing, for instance a measuring instrument. There is also provided a further clamping body means 2 which is constructed similar to the clamping body means 1 and at which there is secured, for instance, a member 3 formed as a measuring feeler means, the construction of which has absolutely no pertinence to understanding the present invention and therefore will not be further dealt with here. Elastic elements 4, which for instance may be blade or leaf springs having a substantially rectangular cross-sectional configuration, are clamped or suspended between the clamping body means 1 and 2 by means of small clamping plates 5 or equivalent expedients. As a result, there is formed a pivotal support or mounting at an axis of rotation A—A, about which the components 2 and 3 can rotate or turn towards the component 1.

It is here pointed out that the elastic elements 4 need not be blade shaped. For instance, it can be assumed that these elastic elements 4 of FIGURE 1 possess a substantially circular cross-section, for instance are in the form of wires. Moreover, the invention also contemplates that these elastic elements 4 can consist of helical or spiral springs, or possess other spatially curved configurations. Furthermore, each of these elastic elements 4 may have a variable cross-section throughout their length, and, in fact, the length thereof can be different from one another. Also, it is desirable to form these elastic elements from a material whose modulus of elasticity is unaffected by temperature fluctuations. It should also be recognized that these elastic elements 4 cross one another when viewed along the axis of rotation of such pivotal support.

Now, the inventive pivotal support differs from known constructions of this type which likewise utilize intersecting or crossed leaf springs, in that, according to the invention the elastic elements 4 in the symmetry position of the pivotal support—in other words, when no external moments act upon such—are not approximately straight or linear, rather are curved or flexed. This curvature or flexure is imparted to the bands by prestressing, that is to say is forced upon them, owing to the manner in which they are clamped or mounted. If they were released or unclamped, in other words, if the clamping force were removed, then they would again assume their original shape or form, which is usually linear and imparted to them during manufacture.

A further aspect of the present invention resides in the fact that, with a predetermined length of the elastic elements their bending resistance or flexural stiffness, which is typically defined as the product of the modulus of elasticity and the equatorial moment of inertia, must not have a predetermined value. In other words, it need not be particularly small in the event the pivotal support should possess a certain, as a general rule small, restoring moment in relation to the deflection. As a matter of fact, the restoring moment can be adjusted by changing the curvature of the elastic elements 4. This will be further explained more fully with regard to the embodiments of FIGURES 3 and 4 for instance.

Figure 2:
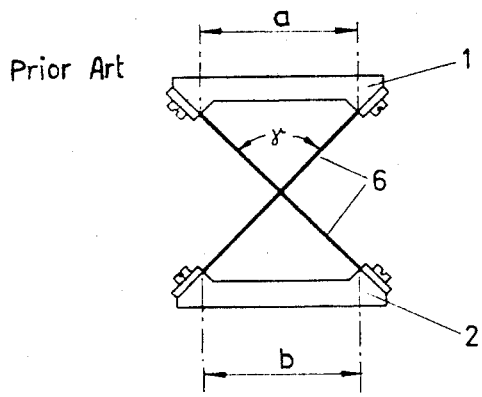
FIGURE 2 depicts a prior art pivotal support and is considered useful for understanding the teachings of the present invention by comparison.

By turning attention now, however, to FIGURE 2, there is depicted therein a cross-spring articulation, one as known for quite some time to the art. In this prior art arrangement, which has been presented hereinfor explanatory purposes and to facilitate understanding of the teachings of the present invention, there will be seen that between the clamping bodies 1 and 2 there are clamped band-shaped spring elements 6, which in the depicted symmetry position of the pivotal support are straight and unstressed. It will be recalled, that such arrangement therefore is different from the inventive pivotal support previously considered with regard to FIGURE 1. Now, for instance if the member 2 is turned or rotated towards the member 1, then, in known manner there acts against such rotation a restoring moment which is in relation to the angle of deviation, the value of which is dependent upon the base length $a$ and $b$, the angle $\gamma$, under which the springs 6 cross, the length of these springs 6, their cross-sectional configuration and size, as well as the properties of the material thereof. Consequently, the restoring moment of such so-called cross spring articulation possesses a fixed value which is dependent upon the constructional data which has once been selected.

Figure 3:
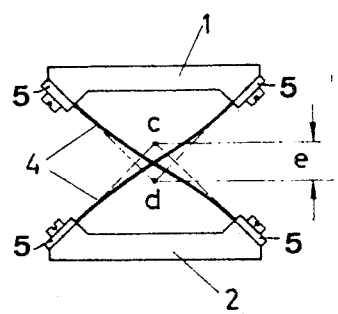
FIGURE 3 depicts an end view of the inventive pivotal mounting or support depicted in FIGURE 1.

On the other hand, in FIGURE 3 there is depicted an embodiment of inventive pivotal support of the type previously considered in connection with FIGURE 1. Here, the axis of rotation of this pivotal support is considered to be substantially at right angles to the plane of the drawing. Clamping of the spring or resilient elements 4 to the clamping body means 1 and 2 is undertaken such that the points of intersection, which would result if one imagines the clamping surfaces of the clamping plates 5 extended, do not coincide. These points of intersection are designated by reference characters $c$ and $d$. The spacing or distance $e$ between the points $c$ and $d$ now appear in addition to the values mentioned in FIGURE 2 and which determine the restoring moment. Specifically, with an increasing value of $e$ the restoring moment of the pivotal support becomes smaller.

Figure 4:
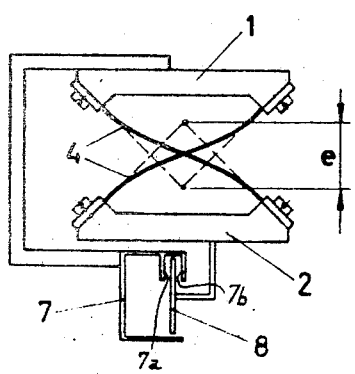
FIGURE 4 depicts a modified form of inventive pivotal support incorporating oscillation dampening means.

FIGURE 4 depicts an embodiment in which the value of the spacing or distance $e$ is selected to be still larger. In this case, the restoring moment is even smaller than with the embodiment of FIGURE 3, assuming that in both embodiments the dimensions of the components 1 and 2 are the same and that the same resilient elements 4 are employed. With a certain value of the spacing $e$ the restoring moment of the pivotal support disappears. If the value of $e$ is selected to be greater beyond this amount, then the restoring moment changes its sign, in other words, it strives to increase the deflection. This means that the pivotal support is no longer stable in the depicted symmetry position. Constructions of the last mentioned type, or those which are completely free of restoring moments, can be utilized in accordance with the invention for a great many purposes.

Furthermore, in FIGURE 4 there is illustrated the manner in which the inventive pivotal support or mounting can advantageously be provided with an oscillating dampening device. To this end, there is provided a dampening cylinder 7 in which moves a damping or dampening piston 8 operably coupled with the oscillating member or clamping body means 2. Naturally, other types of dampening mechanisms could be utilized. Furthermore, this embodiment also shows two stop or limit means 7a and 7b which delimit the deflections.

From FIGURES 3 and 4 it will also be recognized that, in contradistinction to known pivotal supports, with the invention the constructional dimensions do not increase if the restoring moment is selected to be smaller, rather, as a matter of fact in such case, the spacing of the components 1 and 2 becomes even smaller. It is particularly noteworthy that the resilient elements 4 become shorter when the restoring moment is smaller. This appears to be contrary to usual experience in that, for instance, a leaf spring opposes a deviation with that much greater resistance the shorter it is. As a result, it should be really clear what decisive importance is imparted to the particular form of the elastic line which is forced upon the spring elements according to the teachings of the present invention.

For certain applications it is advantageous to make adjustable the magnitude of the spacing or distance $e$, by means of which the elastic lines of the resilient or spring elements and thus the restoring moment of the pivotal support is influenced. This could be necessary if, for instance, a specific predetermined restoring moment is required for the pivotal support, or if the restoring moment of the support should be changeable, perhaps for instance in order to be able to adjust different measuring sensitivities at one measuring instrument.

Figure 5:
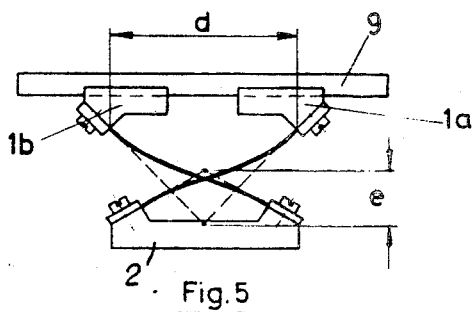
FIGURE 5 is a further variant of inventive pivotal support or mounting.

Now, FIGURE 5 depicts an embodiment of inventive pivotal support which renders it possible to change the magnitude of the distance or spacing $e$. Referring to this figure, it will be recognized that at least one of the clamping body means is composed of two portions or members 1a and 1b which are connected to the member 9 such that at least one of these portions can be displaced in such a manner that it is possible to change the distance $d$ between these two portions 1a and 1b. The mechanical devices required for this purpose are advantageously provided in known manner such that the value of $d$ can be regulated between an upper and lower boundary value, steplessly by measurable amounts, and can be fixed, by appropriate means, in the momentary desired position. Naturally, it would also be possible to provide apparatus for the adjustment of discrete values of $d$. Moreover, the other clamping body means, in this case clamping body means 2, could also, if desired, be formed of two positions in like manner as previously considered with respect to the portions 1a and 1b.

In FIGURE 6 there is shown a further possibility for the adjustment or regulation of the value of the spacing or distance $e$. In this case, one of the clamping body means, as shown, is constructed such that both of its portions 1a and 1b can be turned or rocked towards or away from one another about the pivot point $a$ and fixed in the selected position by any appropriate fixation means. The restoring moment of the pivotal support is then determined by the selection of a predetermined angle $\epsilon$. Here again, the other clamping body means 2 could also be formed of two pivotally interconnected portions.

Finally, FIGURE 7 depicts an arrangement providing an adjustment possibility for the spacing or distance $e$ which combines the previously described adjustment possibilities of both of the FIGURES 5 and 6. Here, by rotating both of the clamping body portions 1a and 1b about the pivot point $a$ there is varied both the spacing or distance $d$ as well as also the angle $\epsilon$.

FIGURE 8 depicts the inventive pivotal support or mounting in a position in which both of the clamping body means 1 and 2 are turned by an external moment through the angle $\alpha$ towards the symmetry position. It will be recognized that the resilient or spring elements 4 retain their characteristic configuration, for instance the S-shaped configuration shown for example in FIGURE 3 and 4, and that in particular their curvature always remains in the same direction. By virtue of the latter, it follows that also the bending moments in the resilient elements retain their sign during a deflection.

As is known, particularly with blade or leaf springs, irregularities oftentimes occur in the restoring force if the bending moment changes its sign. The reason for this is attributable to the unpreventable manufacturing inaccuracies, above, all the difficulty of producing exactly flat leafs. A further noteworthy advantage of the inventive pivotal support resides in the fact that it prevents this effect.

Pivotal supports with small restoring moment are generally only suitable for use in a given position, because they are generally not capable of taking up forces which act in random directions. However, such forces are exerted by the weight of the structural component connected with the movable portion of the support. They can become exceptionally large if the support is subjected to accelerations. The fact that with the inventive pivotal support it is possible to select the restoring moment independently of the dimensions of the elastic elements renders it possible to construct the latter, namely the elastic elements, such that the pivotal support can take up considerable forces and moments in all directions. The stability of the resilient elements protects it from overloading and destruction and additionally ensures that the axis of rotation remains spatially fixed, in other words, does not change its position under the action of forces and moments. Therefore, the pivotal support has, in fact, only a freedom of rotational movement.

FIGURE 9 clarifies the behavior of the inventive pivotal support in the presence of applied forces and moments. The component or clamping body means 1 is here assumed as a stationary member, and the component 2 as a pendulating or oscillating member. Reference characters $x$, $y$, $z$ represent a coordinate system which is at right angles to one another, whereby $x$ passes through the axis of rotation of the pivotal support, $y$ is disposed in one plane of symmetry of the pivotal support, and $z$ in the other.

The moment $Mx$ causes a rotational movement about the axis of rotation, in other words brings about the normal function of the pivotal support. The force $Px$ loads the resilient elements in shear and bending. Now, if the elastic elements are formed as blade or leaf springs, owing to their width there results a high loadability in the direction $x$. This means that the inventive pivotal support is suitable for use when a vertical axis of rotation is required.

A particularly high loadability results in the direction of $z$ if the force $Pz$, as depicted, acts such that the elastic elements 4 are subjected to tension. With horizontal axis of rotation of the pivotal support the weight of the component connected with the movable clamping body means can be large. The moment $Mz$ brings about tension, compression, and shearing stresses in the resilient or spring element 44, the moment $My$ and the force $Py$ tension and compression stresses. All of these loads, which can be of considerable magnitude, are taken up by the inventive pivotal support or mounting.

Vertical axes of rotation are oftentimes used in practice. For those cases where the forces (force of gravity) acting along the vertical are so large that they would exceed the loadability of the elastic elements 4 of the pivotal support, there is then advantageously employed an unloading or relieving device. A possible constructional embodiment of one such load relief device is depicted in FIGURE 10. Here, the load relief means is in the form of a relief or unloading element 11, which can be a wire or a band, which completely or partially carries the weight of the movable clamping body means 2 of the pivotal support. In this regard, the degree of unloading is regulated in known manner by a blade or leaf spring 10 and an adjusting screw 12 or the like, both of which are fixedly connected with the stationary clamping body means 1 of the pivotal support. As is known, such type unloading device also possesses a restoring moment. This is added to that of the pivotal support. The possibility of adjusting the restoring moment by means of the inventive pivotal support, enables compensation of the restoring moment of the suspending-type relief element here shown. It should be apparent that also different types of relief means could be provided, as for instance, magnetic relief, lift or buoyant relief mechanisms, or equivalent structures.

It will also be understood that the support member 13 at which the relief element 11 is retained is, in turn, affixed to the leaf spring 10 such that it can be turned. Due to such a turning or rotation of the support member 13 there is produced a torsion moment in the relief element 11. Owing to such arrangement it is possible, for instance, to adjust an indicator 14 to a predetermined value—approximately to the null or zero point—of a non-illustrated scale extending perpendicular to the plane of the drawing. Such devices for the null or zero adjustment are naturally also possible independent of a relief mechanism.

FIGURE 10 further shows both of the pairs of the elastic elements 4 which are secured at their ends by means of threaded connections 5a and the clamping plates 5 for instance, to the clamping body means 1 and 2, as such has already been described in connection with the preceding figures. The axis of rotation and the line of symmetry of the entire arrangement are disposed in the plane of the drawing. Furthermore, the elastic elements 4 projected into the plane of the drawing, considering each pair, are parallel to one another. This parallel arrangement may also be the same for the other previously described embodiments.

Oftentimes in practice it is necessary that a component should be capable of performing a rotational movement about two axes. A very well known example of this is the free gimbal mounted gyro.

Such supports with two degrees of freedom of rotational movement can be constructed by combining two of the inventive pivotal supports. FIGURE 11 shows an embodiment of such. It wil be recognized that one pivotal support is composed of the clamping body means 15 and 19 and the other pivotal support of the clamping body means 16 and 18. The clamping body means 15 and 16 are fixedly inter-connected by means of the member 17. It will be recognized that, as a result, the indicator 14 secured to the clamping body means 18 is therefore rotatable about two axes. One of these axes is situated in the plane of the drawing and encloses with the other an angle of about 90°. The clamping body means 19 supports the entire arrangement and is secured to a portion of a non-illustrated indicating or measuring instrument.

Naturally, it would also be possible to construct pivotal supports in which the axes of rotation enclose an angle with one another which deviates from 90°. In this respect the invention also contemplates the construction of pivotal support arrangements having more than two axes of rotation.

Additionally, in FIGURE 11 there is also depicted a particular manner of clamping the elastic elements 4. Both of the outer pair of elastic elements 4 have been projected into the plane of the drawing. This plane of the drawing corresponds with the axis of rotation and the line of symmetry of both of the clamping body means 15 and 16. In the depicted view, the elastic elements 4 belonging to one pair are not parallel, as was the case with the previous embodiments, rather enclose an angle with one another, different from the embodiment of FIGURE 10, for instance, where there was a parallel arrangement and clamping of the corresponding elastic elements depicted therein. Likewise, if a plane is passed through the axis of rotation and the line of symmetry of both of the other clamping body means 16 and 18, then the projection of the elastic elements which are situated between these clamping body means 16, 18, also form at this plane an angle with one another, and each pair will enclose such an angle. However, the elastic elements 4 between the clamping bodies 16 and 18 could also be parallel in arrangement, whereas the elastic elements 4 between the clamping body means 15, 19 form an angle with one another. It is also possible that with the embodiments depicted in the other figures previously considered, the elastic elements 4 thereof are clamped such that they enclose an angle with one another.

In the previously depicted exemplary embodiments, the inventive pivotal supports thereof always employed in each instance two or four elastic elements. Quite obviously, it would also be possible to construct pivotal supports with three or with more than four elastic elements. Generally, it can be stated that the inventive pivotal support exhibits at least two elastic elements.

Finally, it will be understood and should be appreciated that the various embodiments depicted herein can have individual features of one combined with features of another embodiment, insofar as any such modifications would not conflict with one another.

While there is shown and described present preferred embodiments of the invention it is to be distinctly understood that the invention is not limited thereto, but may be otherwise variously embodied and practiced within the scope of the following claims.

Accordingly, what is claimed is:

1. A pivotal support for limited deflections, especially for use with measuring instruments, comprising spaced clamping body means, at least two flexurally stiff and elastic elements suspended between said clamping body means, said elastic elements crossing when viewed along the axis of rotation of said pivotal support, means for rigidly mounting said elastic elements at said clamping body means such that each of said elastic elements is forced to flex along a line which deviates from a straight line, said forced lines of flexure being defined by at least approximately cubical parabolas, the ratio of the restoring moment to the angle of deflection, in the moment-free position of said pivotal support, being that much smaller the greater the deviation the forced lines of flexure of said elastic elements are from a straight line.

2. A pivotal support as defined in claim 1, wherein at least one of said clamping body means is comprised of at least two displaceable members.

3. A pivotal support as defined in claim 1, wherein at least one of said clamping body means is comprised of at least two pivotable members.

4. A pivotal support as defined in claim 1, wherein each clamping body means is comprised of at least two displaceable members.

5. A pivotal support as defined in claim 1, wherein said elastic elements possess a substantially circular cross-section.

6. A pivotal support as defined in claim 1, wherein said elastic elements possess a substantially rectangular cross-section.

7. A pivotal support as defined in claim 1, wherein the projections of said elastic elements into a plane containing the axis of rotation and line of symmetry of said pivotal support are at least approximately parallel.

8. A pivotal support as defined in claim 1, wherein the projections of said elastic elements into a plane containing the axis of rotation and line of symmetry of said pivotal support enclose an angle with one another.

9. A pivotal support as defined in claim 1, wherein said elastic elements possess substantially the same length.

10. A pivotal support as defined in claim 1, wherein said elastic elements possess different lengths.

11. A pivotal support as defined in claim 1, incorporating at least two pairs of clamping body means and at least two pairs of elastic elements intercoupled to pivot about two different axes of rotation.

12. A pivotal support as defined in claim 11, wherein said two axes of rotation enclose substantially a right angle with one another.

13. A pivotal support as defined in claim 1, further including stop means for limiting the range of deflection of said pivotal support.

14. A pivotal support as defined in claim 1, wherein said elastic elements are formed of a material whose modulus of elasticity is unaffected by temperature fluctuations.

15. A pivotal support as defined in claim 1, further including means for relieving loading of said pivotal support effective in said direction of rotation axis.

16. A pivotal support as defined in claim 15, wherein said relieving means is a band member.

17. A pivotal support as defined in claim 15, further including means for rotatably mounting said relieving means.

18. A pivotal support arrangement for limited deflections, particularly suitable for use with measuring instruments, comprising at least one pair of clamping body means at least one of which is pivotable about an axis of rotation, at least two elastic elements, means for rigidly clamping each of said two elastic elements to said pair of clamping body means, with said elastic elements crossing when viewed along said axis of rotation, each of said elastic elements being flexed and clamped between said clamping body means such that it assumes a curvature deviating from a straight line.

19. A pivotal support as defined in claim 18, wherein each elastic element assumes a substantially S-shaped curvature.

References Cited

UNITED STATES PATENTS

| | | | |
|---|---|---|---|
| 601,573 | 3/1898 | Long | 248—387 |
| 821,055 | 5/1906 | Ordway | 248—387 |
| 1,482,370 | 1/1924 | Spilger. | |
| 2,439,530 | 4/1948 | Tea. | |
| 2,581,965 | 1/1952 | Miller. | |
| 3,081,552 | 3/1963 | Reason. | |
| 3,102,721 | 9/1963 | Linville | 248—350 |

CHANCELLOR E. HARRIS, Primary Examiner

J. PETO, Assistant Examiner

U.S. Cl. X.R.

248—387, 399; 267—1